United States Patent
Shankar et al.

(10) Patent No.: US 9,317,554 B2
(45) Date of Patent: Apr. 19, 2016

(54) SQL GENERATION FOR ASSERT, UPDATE AND DELETE RELATIONAL TREES

(71) Applicant: Microsoft Corporation, Redmond, WA (US)

(72) Inventors: Srinath Shankar, Madison, WI (US); Rimma Nehme, Madison, WI (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/627,786

(22) Filed: Sep. 26, 2012

(65) Prior Publication Data

US 2014/0089294 A1     Mar. 27, 2014

(51) Int. Cl.
    *G06F 17/30*     (2006.01)

(52) U.S. Cl.
    CPC .................. *G06F 17/30463* (2013.01)

(58) Field of Classification Search
    USPC ............. 707/5, 200, 715, 769, 747, 737, 714, 707/718; 713/150
    See application file for complete search history.

(56) References Cited

U.S. PATENT DOCUMENTS

| | | | |
|---|---|---|---|
| 6,578,028 B2 | 6/2003 | Egilsson et al. | |
| 7,676,453 B2 * | 3/2010 | Ozbutun | 707/999.003 |
| 7,933,913 B2 | 4/2011 | Denuit et al. | |
| 8,103,689 B2 | 1/2012 | Gupta et al. | |
| 8,356,027 B2 * | 1/2013 | Jaecksch et al. | 707/713 |
| 8,538,985 B2 * | 9/2013 | Betawadkar-Norwood et al. | 707/770 |
| 2004/0243799 A1 * | 12/2004 | Hacigumus et al. | 713/150 |
| 2005/0097072 A1 * | 5/2005 | Brown et al. | 707/1 |
| 2005/0138081 A1 * | 6/2005 | Alshab et al. | 707/200 |
| 2006/0074901 A1 * | 4/2006 | Pirahesh et al. | 707/5 |
| 2008/0071748 A1 * | 3/2008 | Wroblewski et al. | 707/3 |
| 2008/0140629 A1 | 6/2008 | Porter | |
| 2010/0030748 A1 * | 2/2010 | Netz et al. | 707/3 |
| 2011/0055200 A1 * | 3/2011 | Sovio et al. | 707/715 |
| 2011/0113054 A1 * | 5/2011 | McLean et al. | 707/769 |
| 2011/0295838 A1 * | 12/2011 | Collins et al. | 707/715 |
| 2011/0302151 A1 * | 12/2011 | Abadi et al. | 707/714 |
| 2011/0313999 A1 * | 12/2011 | Bruno et al. | 707/718 |
| 2012/0054173 A1 * | 3/2012 | Andrade et al. | 707/714 |
| 2012/0331000 A1 * | 12/2012 | Mehra | 707/769 |

OTHER PUBLICATIONS

"TSQLAssert: Assertion Framework for SQL Server", Published on: Mar. 18, 2005, Available at: http://www.datamanipulation.net/tsqlmacro/tsqlassert.asp.

"Assert Showplan Operator", Retrieved on: Jul. 17, 2012, Available at: http://msdn.microsoft.com/en-us/library/ms187603%28v=sql.105%29.aspx.

Freedman, Craig, "Scalar Subqueries", Published on: Sep. 27, 2006, Available at: http://blogs.msdn.com/b/craigfr/archive/2006/09/27/774107.aspx.

\* cited by examiner

*Primary Examiner* — Mariela Reyes
*Assistant Examiner* — Thong Vu
(74) *Attorney, Agent, or Firm* — Aneesh Mehta; Kate Drakos; Micky Minhas (57) ABSTRACT

Presented is a system and method for evaluating relational database queries in a distributed system. An optimized query plan is received by a control node. The query plan is decoded to a SQL statement that is semantically equivalent to the query plan, even though the query plan contains elements that have no direct analog in SQL. The decoded SQL is transmitted to a compute node for execution.

21 Claims, 9 Drawing Sheets

Intermediate Representation 203

FIG. 3A

```
WITH DmlTarget (c_nationkey, c_custkey, c_mktsegment, c_acctbal)
AS    (SELECT T1_1.c_nationkey AS c_nationkey,
              T1_1.c_custkey AS c_custkey,
              T1_1.c_mktsegment AS c_mktsegment,
              T1_1.c_acctbal AS c_acctbal
       FROM   (SELECT T2_1.c_nationkey AS c_nationkey,
                      T2_1.c_custkey AS c_custkey,
                      T2_1.c_mktsegment AS c_mktsegment,
                      T2_1.c_acctbal AS c_acctbal
               FROM   [tpch_1000gb].[dbo].[h_customer_[PARTITION_ID]] AS T2_1
               WHERE  (T2_1.c_acctbal > CAST (5.0 AS NUMERIC (2, 1)))) AS T1_1)
DELETE TargetAlias
FROM   (SELECT T2_1.n_nationkey AS n_nationkey
        FROM   [tpch_1000gb].[dbo].[r_nation] AS T2_1
        WHERE  (T2_1.n_name = CAST ('asdf' AS VARCHAR (4)))) AS T1_1
       INNER JOIN
       DmlTarget AS TargetAlias
       ON (TargetAlias.c_nationkey = T1_1.n_nationkey)
       INNER JOIN
       [tpch_1000gb].[dbo].[h_customer_[PARTITION_ID]] AS T1_2
       ON ((TargetAlias.c_custkey = T1_2.c_custkey)
           AND EXISTS (SELECT 1 AS C1
                       FROM   [tpch_1000gb].[dbo].[r_region] AS T2_1
                       WHERE  (TargetAlias.c_mktsegment = T2_1.r_name)))
WHERE  EXISTS (SELECT 1 AS C1
               FROM   [tempdb].[dbo].[Q_[TEMP_ID_1]] AS T2_1
               WHERE  (((T1_1.n_nationkey + T1_2.c_nationkey) + T1_1.n_nationkey) =
                      T2_1.p_partkey))
```

Decoded SQL 204

SQL GENERATION FOR ASSERT, UPDATE AND DELETE RELATIONAL TREES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright©2012, Microsoft Corp.

BACKGROUND

Symmetric multiprocessing ("SMP") systems involve multiple processors connected to shared resources such as memory and disk storage. Typically, SMP systems use a single shared system bus for communication between the processors and system resources. The scalability of these systems is limited by the bandwidth available on the shared system bus. Although the limitation may be mitigated by architectures that creates localized clusters of processors and memory, it may not be eliminated. Very large data warehouse solutions are often impractical on SMP systems because of this scalability bottleneck.

To handle the large amounts of storage and processing power needed for very large data warehouse solutions, massively parallel processing may be used instead of SMP. Massively parallel processing systems utilize numerous independent servers in parallel, and unlike SMP systems can scale in direct proportion to the number of additional servers added.

A data warehouse built using massively parallel processing architecture may utilize a control node in combination with multiple compute nodes, each of which may be an independent relational database system containing its own processors, memory, and disk storage. The control node is may act as a server that receives a user query and transforms it into an optimized query plan that can be used to distribute workload between the various compute nodes. Each compute node may then execute a portion of the user query as assigned by the optimized query plan.

In the data warehouse system just described, the control node transmits instructions to each compute node concerning which portion of query plan the compute node should execute. One approach to this problem is to develop a custom communications protocol between the control node and the various compute nodes. This approach adds significant complexity to the design and development of the compute nodes. In addition, it prevents the use of "off-the-shelf" relational database systems on the compute nodes, because this approach requires that each compute node be adapted to work with the custom communications protocol.

SUMMARY

In light of the above-described limitations of the prior art, it would be advantageous to transmit instructions from the control node to the compute nodes using industry standard languages and protocols.

Structured query language ("SQL") is a computer language commonly understood by relational database systems that is capable of describing database queries. Therefore, representation of these instructions as SQL would be convenient. In addition, the use of SQL would facilitate the use of associated application programming interfaces ("APIs") such as ODBC and OLE DB. The use of SQL therefore eliminates the need to develop a custom protocol for communication between the control node and the compute nodes. Those of ordinary skill in the art will recognize, however, that the techniques described herein are applicable not only to variants of the SQL language, but also to languages and protocols other than SQL, such as binary query representations.

In order to use SQL, a technique is needed that is capable of generating valid SQL statements based on the portion of the optimized query plan assigned to the control node to execute. This is a difficult problem. While SQL is a declarative language describing a set of data to be retrieved or modified, a query plan is an ordered, procedural series of steps describing a sequence of low-level operations to be performed, such as table scans and sorting operations. Some of these operations have no direct analogue in SQL, such as assert operations. A query plan may also describe operations such as updates and deletes. These too have no direct analogue in the SQL language. Although SQL has UPDATE and DELETE keywords, in a query plan their meaning is different, in part due to the means by which a query plan identifies the data to be updated.

Another difficulty is that in order for the optimized query plan to be faithfully executed on the compute nodes, it is desirable that the generated SQL statements have the same semantic meaning as the portions of the query plan that they represent, even under failure conditions. Semantic equivalence requires that execution of the SQL statement produce the same effect as direct execution of the query plan, even when execution results in an error. If execution does results in an error, it is desirable that the same error condition be produced. Production of semantically equivalent SQL statements is a difficult problem because the optimized query plan contains elements with no direct analogue in SQL. However, without an appropriate mechanism to automatically produce semantically equivalent SQL statements, the optimized query plan cannot be faithfully executed on the compute nodes.

Accordingly, there is a need for a mechanism to reliably produce SQL statements with the same semantic meaning as some or all of an optimized query plan, even though elements of the query plan contain no direct analogue in SQL.

Embodiments of the present invention meet the above-mentioned needs by providing an apparatus and method to generate SQL statements that are semantically equivalent to optimized query plans, even when the query plan contains elements that have no direct analogue in SQL.

In a massively parallel processing system, a control node is a computing device that acts to receive an incoming query. The control node also performs a parallel optimization process that identifies an optimized distribution of workload across the various compute nodes. At the end of a parallel optimization phase, the control node may act to produce a tree of operators, or some other data structure, that represents the final query plan to be executed. The query plan describes a sequence of steps that are performed to satisfy the incoming query, including steps to be performed on one or more of the compute nodes. These steps may be comprised of elements of the tree that indicate relational or logical operations, including those that have no direct analogue in SQL.

The assert operator is one example. It is used in the query plan to throw an error if a certain boolean condition is true at a given point in the query plan. For example, an assert operator might be used to ensure that a scalar subquery in the query plan returns only one row. The assert statement has no direct analogue in SQL, but a semantic equivalent may be constructed using a construct in the SQL language known as a CASE expression, which is one means of expressing conditional logic in the SQL language. A CASE expression may be constructed to emulate testing the condition described by the assert operator, and to fail in a semantically equivalent way if that condition is met. As those of ordinary skill in the art will recognize, other conditional statements may be used in place of a CASE expression.

Update and delete operators are another example, because they are typically described in the query plan through internal representations such as bookmark columns or row ids ("RIDs"). Semantically, the update and delete operators in a query plan identify the rows to be updated or deleted by joining a target table with a set of RIDs returned by a previous step in the query plan. The join combines the target table with the set of RIDs, and produces a set of data comprising only rows from the target table that have matching RIDs. However, the compute nodes will not typically have access to RIDs. Instead, the updates and deletes may be decoded to SQL statements that are semantically equivalent to the update operator in the query plan, but that rely on the compute node's relational database capabilities to determine the set of update targets.

DETAILED DESCRIPTION OF ILLUSTRATIVE EMBODIMENTS

Hardware and Operating Environment

Figure 1:
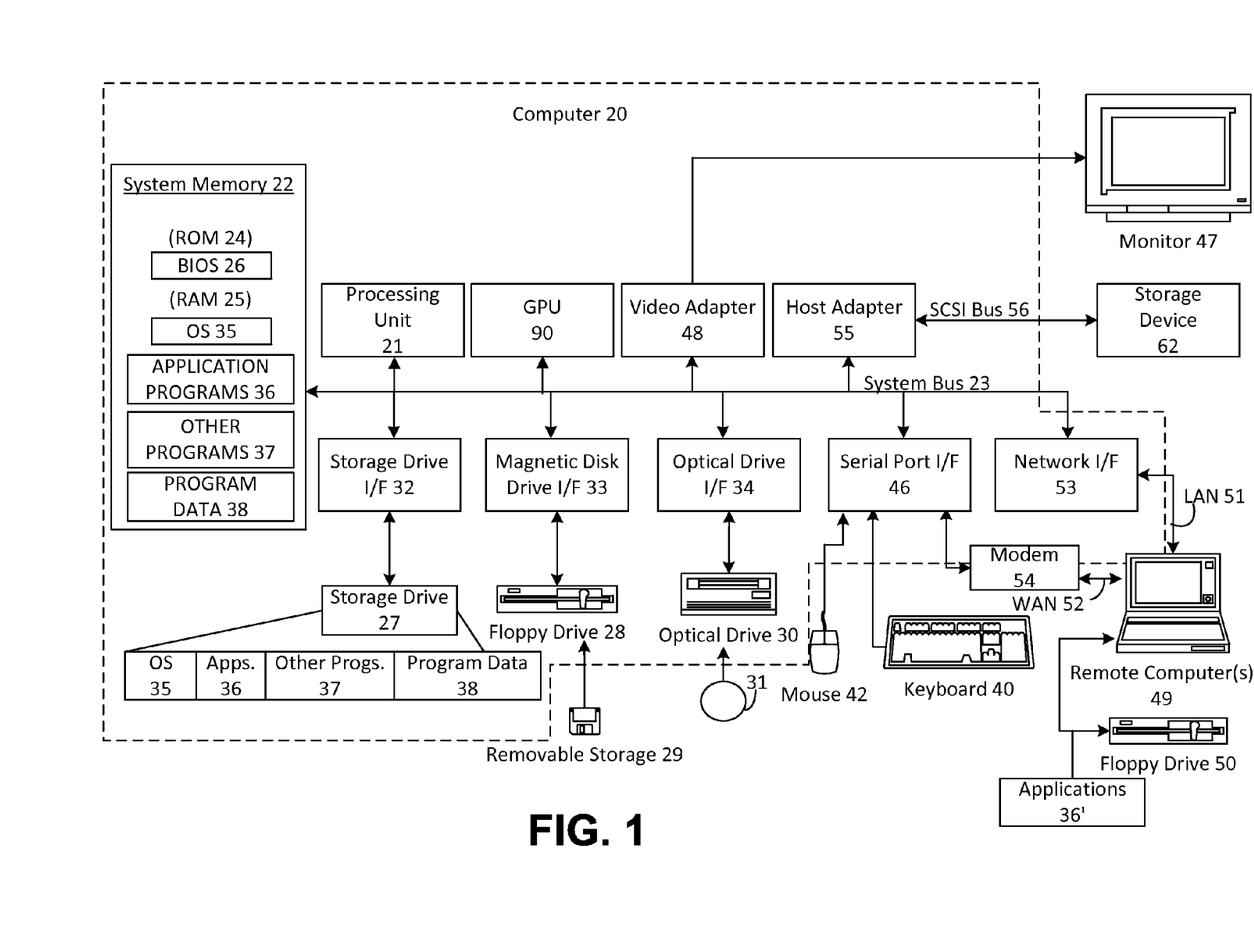
FIG. 1 depicts an example computer in which embodiments of the invention may be implemented.
Figure 2:
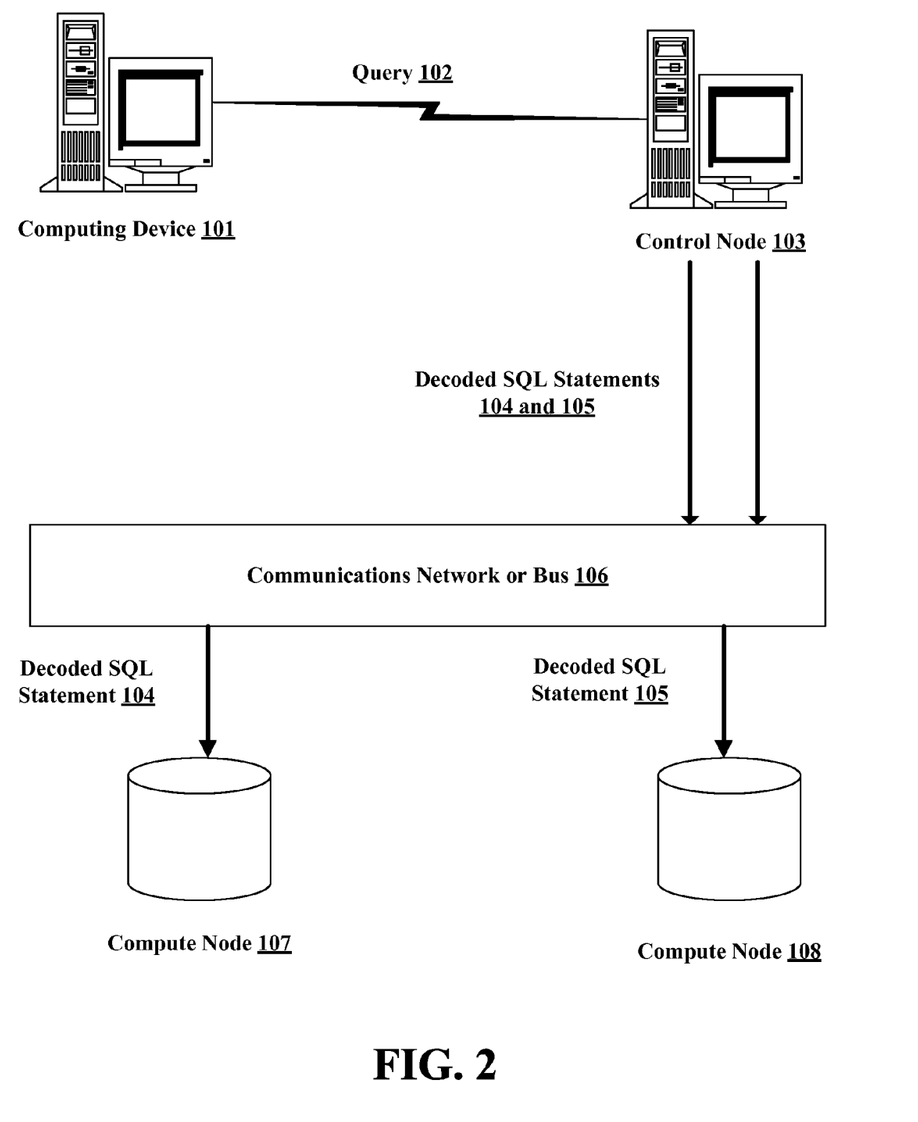
FIG. 2 depicts a diagram of the hardware and operating environment in conjunction with which embodiments of the invention may be practiced.

FIG. 1 and FIG. 2 depict hardware and operating environments in which embodiments of the invention may be practiced. These figures and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics or other, non-graphical workloads benefiting from parallel execution. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

FIG. 2. depicts a network environment in which embodiments of the invention may be practiced. A computing device 101, for example a general purpose computing system as described by FIG. 1, mobile device, or application server, transmits query 102 to a control node 103. The control node 103 communicates with one or more compute nodes, 107 and 108, over some form of communications network or bus 106. The control node and compute nodes may also be any form of computing device, such as the general purpose computing system depicted in FIG. 1. The communications network or bus may take any number of forms, such as a wireless LAN, fiber optics network, or a hardware bus. The control node 103 divides the workload required for execution of query 102 among the compute nodes 107 and 108, and transmits instructions in the form of decoded SQL statements 104 and 105.

The control node may perform a parallel optimization phase, in which it determines an optimal distribution of workload across one or more compute nodes. Typically, a cost-based or rule-based optimization process is used. The result of this phase is typically a query plan, which may take the form of a tree of operators representing the final plan to be executed.

Figure 3:
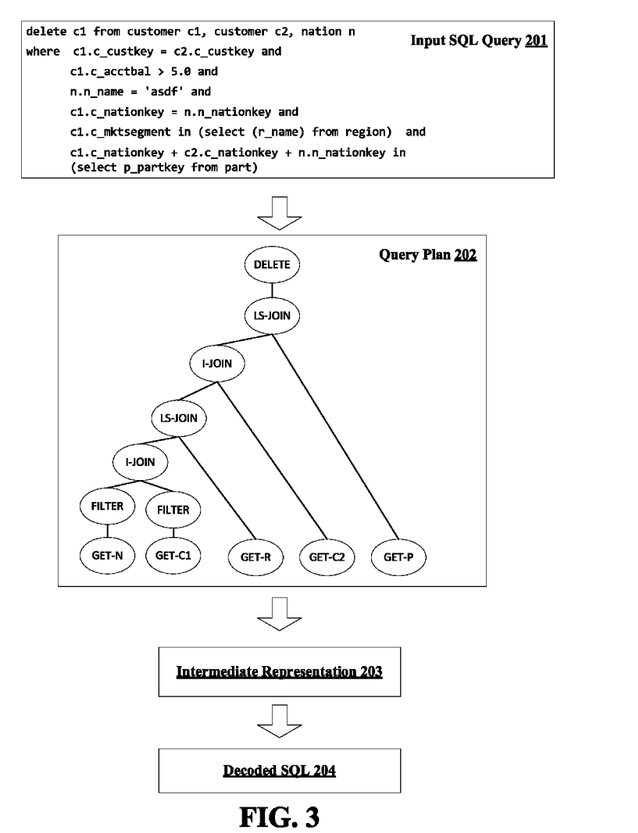
FIG. 3 depicts a diagram illustrating the optimization and decoding process using the delete operator as an example.

An example is query plan 202 depicted in FIG. 3. Those of ordinary skill in the art will recognize that a variety of data structures or representations in addition to trees may be used. Regardless of the form it takes, the query plan comprises a sequence of relational and logical operators to be executed on the compute nodes. The query plan may also comprise data movement operators that describe the movement of intermediate results among the control and compute nodes.

To execute the required steps on a compute node, the corresponding portion of the query plan may be translated to a format understood by the compute node. This process is known as decoding. As noted above, it may be advantageous to use a format such as SQL because it allows the use of an off-the-shelf relational database on the compute nodes and avoids the need for developing a custom protocol. Those of ordinary skill in the art will also recognize that a variety of programming languages or protocols in addition to SQL may be employed.

The process of decoding may be aided by constraining the form of the query plan. For example, operators such as row counts, unions, and aggregates in the query plan may be removed or replaced with no-ops. A no-op is an operator that acts only as a placeholder, or whose execution is skipped. Alternatively, the set of allowable operators in the query plan can be restricted to a set of operators that are compatible with the decoding process such as projections, filters, joins, applies, asserts, and no-ops. Those of ordinary skill in the art will recognize that these constraints may be applied when constructing an intermediate representation of the query plan, rather than on the query plan directly. The decoding process may then operate on the intermediate representation.

Linked Databases

An embodiment may also be practiced by utilizing linked databases, on various system types including massively parallel processing systems and SMP systems. Databases may be linked for a variety of technological and business reasons, such as storage requirements and databases being maintained by different departments within a business organization.

The operation of a linked database system may be explained as follows. A first database is configured to have connection information for one or more additional databases, which may be hosted on different servers or virtual machines. The connection information can be used by the first server to perform operations on the other databases, and therefore serves as part of a link between the two databases. A client of the first database may, for example, issue a query that involves a linked database. The linked database may be referenced in the query explicitly or implicitly. An explicit reference might specify an alias that refers to the link information. Alternatively, the query might involve a view that was originally defined with an explicit reference to the linked database. In this case the query over the view implicitly references the linked server.

After receiving the client's query, the first database may generate a query plan which may, among other functions, describe subqueries to be performed on the linked database. Based on the query plan, one or more SQL statements may be then generated using embodiments of the various techniques described herein, and sent to the linked database for execution. The first server may then receive and assemble the results and return them to the client.

Optimization & Decoding

The optimization and decoding process may act to receive an incoming query. The incoming query may take any form. Next, the incoming query is analyzed and broken down into component queries, based on a variety of factors which may include the location of relevant data, efficiency, performance, or other factors. Each of these component queries is transmitted to a compute node and executed. The control node then receives the results, reassembles them, and returns the results to the issuer of the original incoming query. Breaking the query down and executing it in this manner allows data warehouse solutions to scale indefinitely by adding more compute nodes. By expressing the query with SQL, the relational databases installed on the compute nodes do not need to be specialized for this type of parallel environment, and the overall system has reduced complexity.

FIG. 3 illustrates the decoding process. This process may be executed by control node 103 of FIG. 2. Control node 103 receives input SQL query 201 and performs an optimization process, resulting in query plan 202. An intermediate representation 203 may be constructed, and may comprise elements corresponding to some or all of the query plan 202. The elements of the intermediate representation may also be constrained to remove or replace certain operators, as described above, or other transformations applied. One example is seen in query plan 202, which contains a left semi-join, depicted in FIG. 3 by the indicator "LS-JOIN." In an ordinary join, two tables are combined based on some data element common to both tables, and only those rows with the common data element are returned. A semi-join is similar, but only returns rows from one of the tables. A semi-join may be designated as left or right based on which tables rows are returned. The SQL language contains no syntax that explicitly specifies a semi-join, and thus there is no direct analogue in SQL to a semi-join operator in the query plan.

Figure 3A:
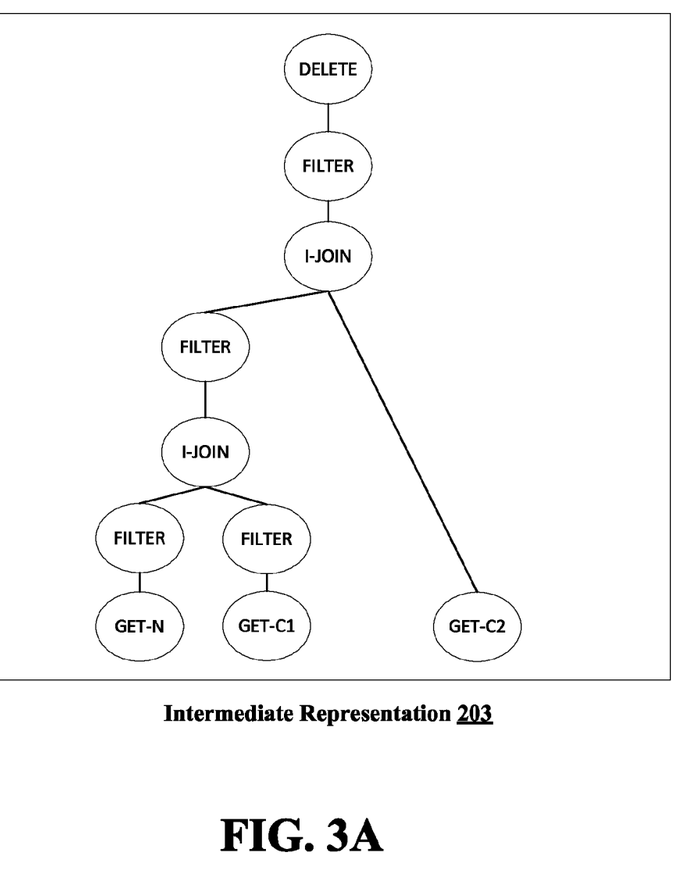
FIG. 3A depicts a detailed view of the intermediate representation illustrated in FIG. 3.
Figure 3B:
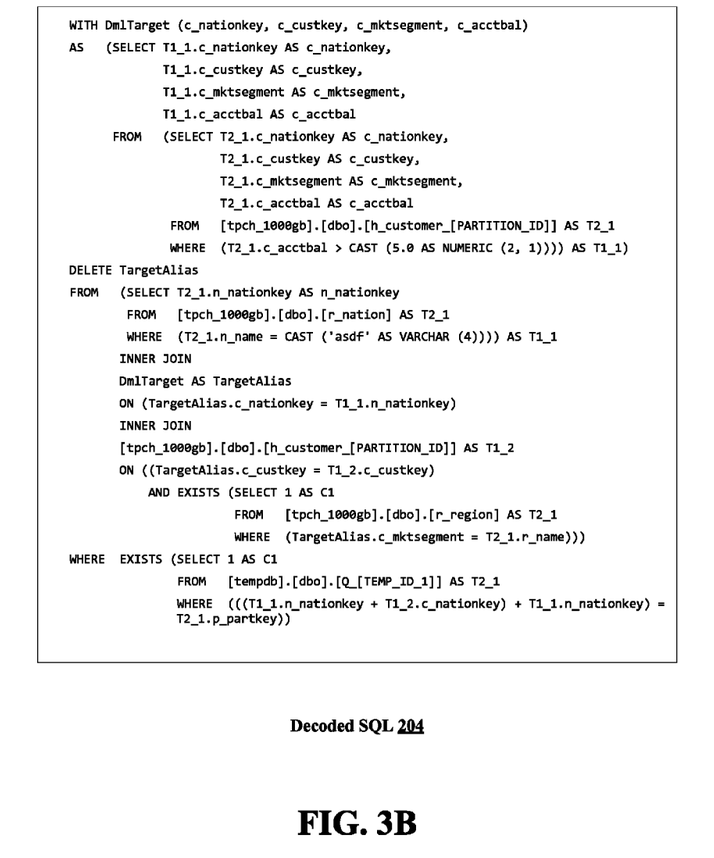
FIG. 3B depicts a detailed view of the decoded sql illustrated in FIG. 3.

The left semi-join represented in query plan 202 may be converted to a filter in intermediate representation 203, as seen in FIG. 3A. FIG. 3B shows decoded SQL 204 resulting from the decoding process illustrated in FIG. 3. A filter operation excludes rows based on a specified criterion. The filter operation may be made semantically identical to the left-semi join by specifying a criterion that excludes the same rows as would be excluded by execution of the left semi-join.

Because the query plan may be optimized to distribute workload among multiple compute nodes, the decoding process may result in multiple decoded SQL statements. Each statement may be executed on the corresponding compute node.

After decoding, the control node transmits the decoded statement to a compute node, which may be identified by the query plan. The compute node executes the statement and may return results to the control node. Additionally, the data movement operators in the query plan may control movement of data among and between the control and compute nodes.

Asserts

In the context of the query plan, asserts are logical operators contained in a query plan to indicate that an error should be thrown if some condition is not met at that stage in the plan. Asserts may be used, for example, to ensure that a scalar subquery in the query plan returns only one row. In general, an assert consists of a boolean condition and an expression that is evaluated, resulting in an error state, only if the condition is true.

In one embodiment, assert operators may be decoded through the use of case expressions. In SQL, a case expression evaluates a list of boolean conditions and returns the result of an expression associated with the first condition to evaluate to true. An assert may therefore be decoded by including the assert condition in the list of case conditions and associating it with a SQL statement that results in an error of the desired form.

Figure 4:
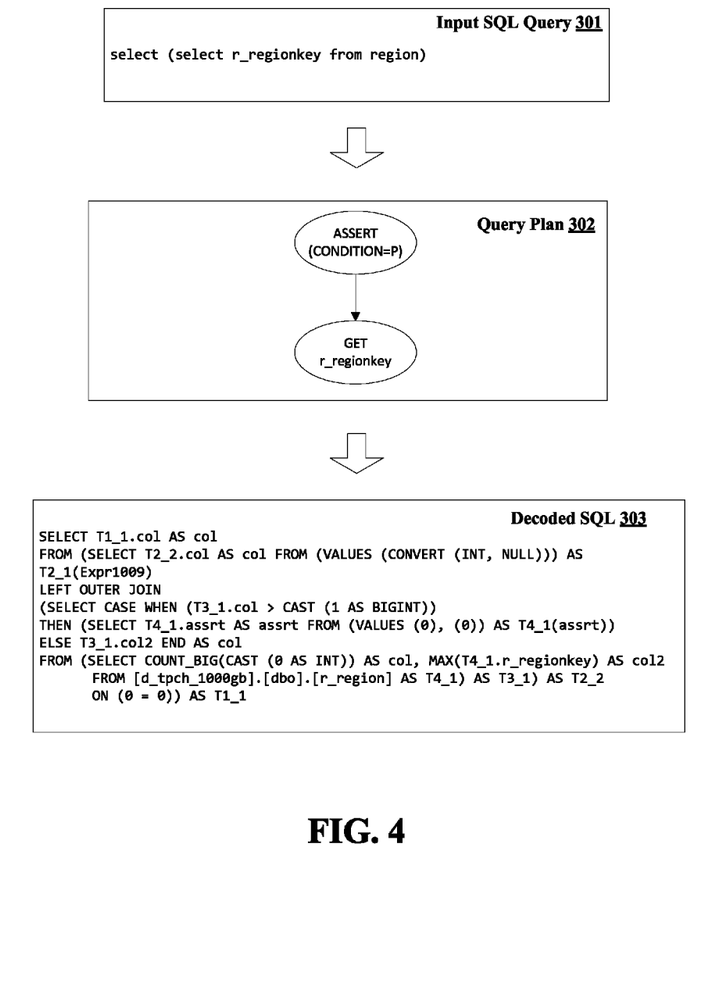
FIG. 4 depicts the decoding process for an assert operator.

The form of the error may be controlled by the use of SQL statements that are guaranteed both to fail when executed and to result in the desired error state. For example, FIG. 4 illustrates the decoding process for input SQL query 301 containing a subquery used as a value expression. When this query is executed, per the SQL language definition an error condition will result if the subquery returns more than one value. Accordingly, query plan 302 includes an assert operator in which the condition, indicated as "P" in FIG. 4, checks to see if more than one value was returned by the get operator. Decoded SQL 303 contains decoded SQL corresponding to both the assert and get operators in the query plan. The SQL corresponding to the assert operator is expressed as a CASE statement in which the condition checks to see if more than one value was returned. If more than one value is returned, evaluation of the associated expression is guaranteed to result in an error of the form "subquery returned more than 1 value." Thus the decoded SQL, when executed by a compute node, mimics the semantic behavior of the assert operator in the query plan.

Updates

A relational database system may execute updates through the use of bookmark columns or a similar construct, such as record identifiers ("RIDs"). In a query plan, the RIDs are used by the update operator to identify rows to be updated. Semantically, the update operator performs a self-join between the target table and the RIDs to identify the rows to be updated.

In a distributed system, the compute nodes will not normally have access to the RIDs. Therefore, an update operator in the query plan cannot normally be decoded as a self-join and some other method is needed. In one embodiment, a semantically equivalent operation may be produced by decoding the query plan update as a SQL expression in which the target rows are identified by a view, view equivalent, or common table expression. The view may be defined so that only the source and target columns are included in the view definition. The decoded statement may comprise a view definition followed by an SQL update statement that uses the view as the target of the update.

The query plan may contain filter operations that restrict the scope of the update. During decoding, these filters may be integrated into to the view definition. Joins may also be integrated into the view definition. The resulting view represents the target of the update operation, and may represent multiple underlying target tables.

Other constructs equivalent to a view may be used, such as a common table expression ("CTE"). A common table expression may be thought of as a view whose lifetime and scope is limited to the execution of a SQL statement. FIG. 5A shows an update operator in the query plan decoded as a SQL statement containing a CTE.

Figure 5:
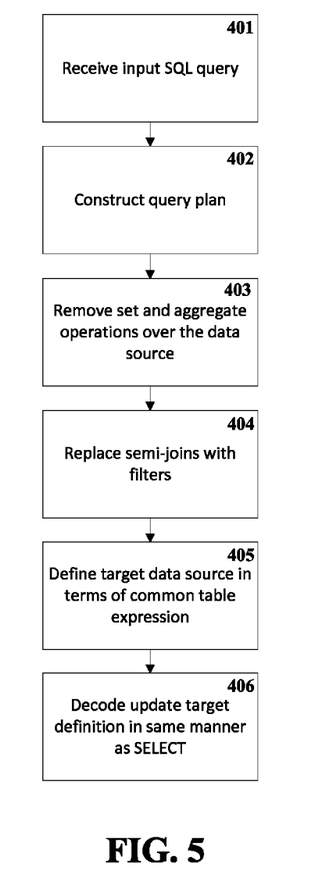
FIG. 5 depicts a diagram illustrating the decoding process for an update operator.
Figure 5A:
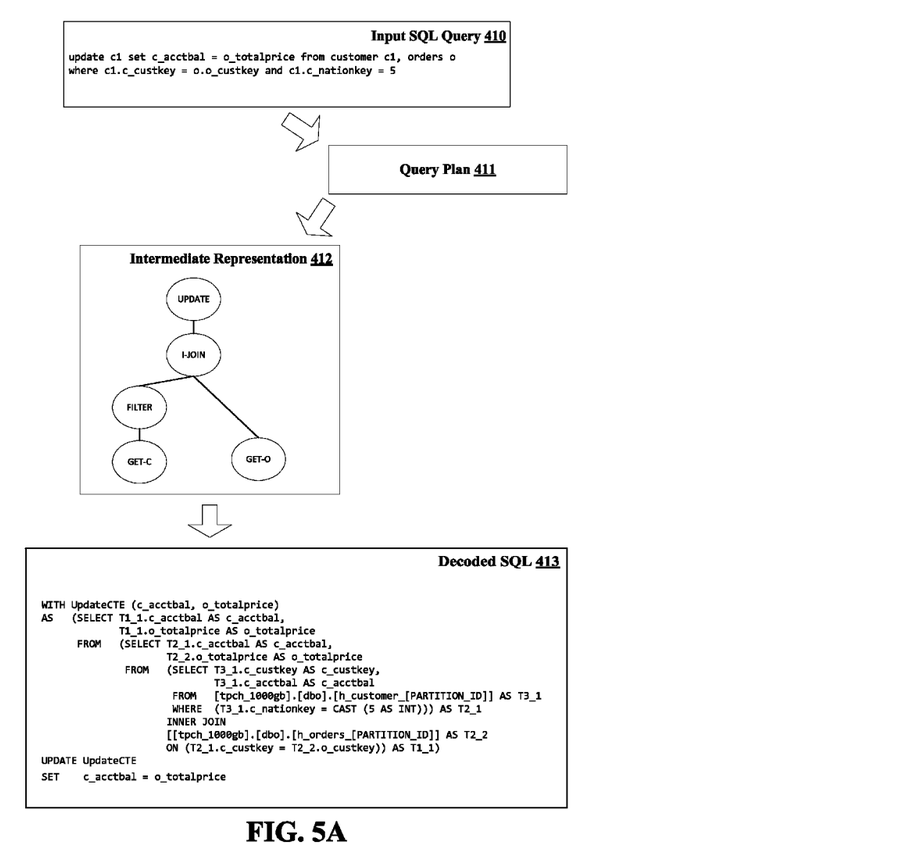
FIG. 5A depicts a more detailed view of the decoding process for an update operator.

FIG. 5 shows one embodiment of the decoding process for updates. Although FIG. 5 describes a series of steps, those of ordinary skill in the art will recognize that the actions described may be performed in varying order, and that some actions may be added, omitted, or altered. In steps 401 and 402, an input SQL query is received and processed into a query plan, respectively. It may be desirable to remove set and aggregate operations over the target data source, step 403. Alternatively, these operations may be translated to no-ops. Step 403 and the subsequently described steps may be done by operating on or transforming the query plan itself, a copy of the query plan, or an intermediate representation. Semi-joins may be replaced by filter operators, step 404. The update targets may be expressed in terms of a view definition or a common table definition, step 405. This has the advantage of allowing the definition of the target rows to be decoded in essentially the same manner as a SQL statement, as shown in step 406. In FIG. 5A, intermediate representation 412 shows a tree structure with an update operator at the root. The descendants of the root may be decoded substantially the same as if they represented elements of a SELECT statement.

The results may then be integrated into the definition of a common table expression, seen in the decoded SQL 413 of FIG. 5A.

Deletes

Relational database systems may also process deletes through the use of a self-join between a target table and a set of RIDs to identify target rows. However, the decoding technique used for updates will not work for deletes because deletes on views with multiple data sources are not be valid in the SQL language.

In one embodiment, a delete operator in the query plan may be decoded using the FROM and WHERE clauses that are part of the syntax of the SQL delete command. Common table expressions may also be used. If so, the decoded delete may take the form seen in FIG. 3B.

Figure 6:
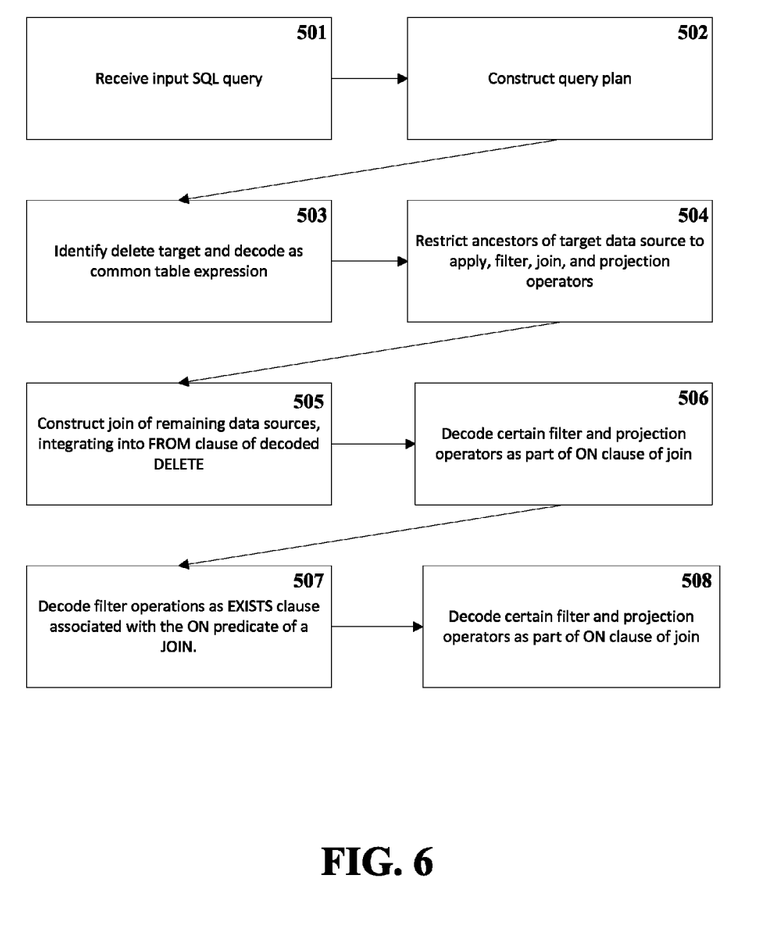
FIG. 6 depicts a diagram illustrating the decoding process for a delete operator.

FIG. 6 depicts a general approach to decoding deletes. Although presented as a sequence of steps, those of ordinary skill in the art will recognize that various embodiments may vary the order in which the steps are performed, as well as omitting, adding, or changing a step.

In step 503, the data source that is the target of the delete operation is identified. Filter and projection operators may be associated with the delete operator in the query plan. These may be absorbed into the target data source, and potentially hoisted into a view, view equivalent, or common table expression. Some embodiments may define the target data source as a view, view equivalent, or common table expression. It may also be desirable to assign an alias to the target data source definition, and to construct the DELETE clause by referencing the alias.

Step 504 may be performed to restrict ancestors of the target data source in the query plan or an intermediate representation to apply, filter, join, and projection operators. This step may be advantageous, given the restrictions imposed by SQL syntax, in constructing a join involving the remaining data sources, step 505. In addition, some operators may be absorbed into the target data source.

Step 505 constructs a join involving the remaining, non-target data sources associated with the delete operation in the query plan. The join is decoded in the resulting SQL statement as part of the DELETE statement's FROM clause. It may be desirable to constrain the decoded SQL according to the following two principles. First, the target data source can be excluded from any subquery, except for a subquery that involves only the target data source. Branches of the query plan that do not include the target data source can be decoded as necessary, i.e. they can be decoded as subqueries. Second, filter and projection operators that are ancestors of the target data source may be decoded as part of the ON clause of their respective join operation, as seen in step 506. Filter and projection operators that are at the root of the tree may be decoded as part of the WHERE clause of the delete query.

Step 507 decodes filter operators in the query plan. In the resulting SQL, the filter operator may be decoded as an EXISTS clause associated with the ON predicate of an inner join. Filter operators immediately below the root may be added to the WHERE clause.

Step 508 produces the final decoded SQL statement. The target data source of the DELETE statement may be expressed as an alias of a common table expression. FIG. 3B shows an example of a decoded delete operator.

CONCLUSION

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media, which do not include signals, and/or computer-readable communication media. Thus, the invention, or certain aspects or portions thereof, may take the form of program code (i.e., instructions) embodied in tangible, or non-transitory, media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed is:

1. A computer implemented method for evaluating a database query, the method comprising:
   receiving a first query language statement in a first query language;
   forming a query plan based at least in part on the first query language statement;
   creating a second query language statement in a second query language, based on the query plan, second query language statement corresponding to at least a subset of the query plan, wherein the at least a subset of the query plan comprises at least one projection, join, apply, assert, or no-op operator and wherein results obtained by executing the second query language statement correspond to results obtained by executing the at least a subset of the query plan;
   transmitting the second query language statement to a compute node;
   receiving a result corresponding to execution of the second query language statement; and
   returning results corresponding to the first query language statement, based on the one or more results from the execution of the second query language statement.

2. The computer implemented method of claim 1, wherein the second query language statement is a SQL statement.

3. The computer implemented method of claim 1, wherein the query plan further comprises an update or delete operator.

4. The computer implemented method of claim 3, wherein the second query language statement comprises an identification of a target row using a view, view equivalent, or common table expression.

5. The computer implemented method of claim 1, further comprising translating the query plan to an intermediate representation and constructing the second query language statement based on the intermediate representation.

6. The computer implemented method of claim 5, further comprising translating semi-joins in the query plan to filter operations in the intermediate representation.

7. The computer implemented method of claim 1, further comprising translating a filter operator in the query plan to a join definition in the second query language statement.

8. The computer implemented method of claim 1, wherein the query plan comprises an assert operator, and where the computer implemented method further comprises:

translating the assert operator in the query plan to a conditional statement in the second query language statement.

9. The computer implemented method of claim 1, wherein the first query language statement is semantically equivalent to the second query language statement.

10. A system for constructing query language statements for execution in a parallel processing environment, the system comprising a processor and a memory, the memory bearing processor executable instructions that, upon execution by the processor, cause the system at least to:

receive a first query;

construct a query plan, based on the first query, that determines a distribution of workload across one or more compute nodes;

create a decoded query language statement that corresponds to at least a subset of the query plan, the at least a subset of the query plan comprising at least one projection, join, apply, assert, or no-op operator, the decoded query language statement suitable for execution on a compute node;

transmit the decoded query language statement to a compute node;

receive a result of executing the decoded query language statement, wherein the result of executing the decoded query language statement is equivalent to a result obtained by executing the at least a subset of the query plan; and return a result corresponding to the first query, based on the result corresponding to execution of the decoded query language statement.

11. The system of claim 10, wherein the memory further bears processor executable instructions that, upon execution by the processor, cause the system at least to:

construct an intermediate representation based on query plan and create the decoded query language statement based on the intermediate representation.

12. The system of claim 10, wherein the memory further bears processor executable instructions that, upon execution by the processor, cause the system at least to:

define target rows in the decoded query language statement through views, view equivalents, or common table expressions.

13. The system of claim 10, wherein the memory further bears processor executable instructions that, upon execution by the processor, cause the system at least to:

translate an assert in the query plan as a conditional expression, in the query language statement, that is guaranteed to fail in a manner semantically equivalent to the assert in the query plan.

14. The system of claim 10, wherein the memory further bears processor executable instructions that, upon execution by the processor, cause the system at least to:

decode a delete operator in the query plan as a delete statement in the query language statement, in which non-target data sources are joined in the delete statement's from clause.

15. The system of claim 10, wherein the result corresponding to execution of the decoded query language statement includes an error, the error equivalent to a second error that would result from executing the first query directly.

16. A computer readable storage medium having stored thereon computer executable instructions that, upon execution by a computer, cause the computer to at least:

receive a first query in a first query language;

create a plurality of intermediate representations corresponding to the first query;

create a plurality of decoded query language statements based on the plurality of intermediate representations, wherein the plurality of decoded query language statements produce results, upon execution, that are equivalent to those produced by executing the plurality of intermediate representations;

transmit the plurality of decoded query language statements to one or more compute nodes;

receive results corresponding to the plurality of decoded query language statements; and transmit results corresponding to the first query, based on the results corresponding to the plurality of decoded query language statements.

17. The computer readable storage medium of claim 16, further having stored thereon computer executable instructions that, upon execution by a computer, cause the computer to decode an assert operator in the intermediate representation to a conditional statement in the decoded query language statement.

18. The computer readable storage medium of claim 16, further having stored thereon computer executable instructions that, upon execution by a computer, cause the computer to decode an update or delete operator in the intermediate representation with a query language statement that identifies a target row through the use of a view, view equivalent, or common table expression.

19. The computer readable storage medium of claim 18, further having stored thereon computer executable instructions that, upon execution by a computer, cause the computer to decode a join in the intermediate representation to a definition of a view, view equivalent, or common table expression.

20. The computer readable storage medium of claim 16, further having stored thereon computer executable instructions that, upon execution by a computer, cause the computer to decode descendants of an update operator in the intermediate representation in substantially a same manner as elements of a select statement.

21. The computer readable storage medium of claim 16, further having stored thereon computer executable instructions that, upon execution by a computer, cause the computer to replace a semi-join with a filter operator in the intermediate representation.

* * * * *